United States Patent [19]

Mazel et al.

[11] Patent Number: 5,249,774
[45] Date of Patent: Oct. 5, 1993

[54] VALVE HAVING A METAL SEAL, IN PARTICULAR A BUTTERFLY VALVE

[75] Inventors: Jean-Luc Mazel, Saint Foy Les Lyon; Gilbert Monnet, Oullins, both of France

[73] Assignee: Alsthom Velan, La Courneuve, France

[21] Appl. No.: 4,083

[22] Filed: Jan. 13, 1993

[30] Foreign Application Priority Data

Jan. 15, 1992 [FR] France .............................. 92 00353

[51] Int. Cl.⁵ .............................................. F16K 1/22
[52] U.S. Cl. ..................................... 251/306; 251/174
[58] Field of Search ................................. 251/306, 174

[56] References Cited

U.S. PATENT DOCUMENTS

| 4,194,749 | 3/1980 | Banofous ..................... 251/306 X |
| 4,477,057 | 10/1984 | Friers ............................ 251/306 |
| 4,502,663 | 3/1985 | Huber ............................ 251/174 |
| 4,901,979 | 2/1990 | Earriques et al. .............. 251/306 |

FOREIGN PATENT DOCUMENTS 0292346 11/1988 European Pat. Off. .
2559232 8/1985 France .

OTHER PUBLICATIONS

Patent Abstracts of Japan, vol. 10, No. 193 (M-496) (2249) Jul. 8, 1986 & JP-A-61 038 268 (Tomoe Gijutsu Kenkyusho) Feb. 23, 1986.

*Primary Examiner*—John C. Fox
*Attorney, Agent, or Firm*—Sughrue, Mion, Zinn, Macpeak & Seas

[57] ABSTRACT

The valve includes a support piece 18 that bends elastically and that bears via its two edges 19 and 20 against a support ring 6 for elastically supporting a dynamic sealing ring 16 that is made of metal. The invention is applicable to butterfly valves.

9 Claims, 2 Drawing Sheets

5,249,774

VALVE HAVING A METAL SEAL, IN PARTICULAR A BUTTERFLY VALVE

The present invention relates to a valve having a metal seal, and in particular to a butterfly valve provided with such a seal.

BACKGROUND OF THE INVENTION

It is known that such valves, and more particularly those designed to be subjected to difficult operating conditions, e.g. valves for cryogenic fluids, need to present both static sealing relative to the outline of their bodies, and dynamic sealing between the shutter member and a peripheral thrust ring. Unfortunately, although satisfactory static sealing is provided by compressing an O-ring between the thrust ring and a portion of the valve body having a compression-limiting rim, completely satisfactory dynamic sealing is not obtained since the dynamic sealing ring that is designed to be subjected to the pressure of the shutter member does not remain centered relative to the shutter member while it is being closed, and this gives rise to variations in the specific contact pressure between the shutter member and the dynamic sealing ring, and consequently gives rise to the possibility of leaks at certain points around the periphery thereof. In addition, it is difficult to obtain sealing rings that present sufficient elastic resistance to crushing by the shutter member (referred to below as "restitution").

An object of the present invention is to provide a valve having a metal seal whose specific contact pressure between the thrust ring and the shutter member does indeed remain constant over its entire periphery, and whose dynamic seal provides greater elastic restitution.

SUMMARY OF THE INVENTION

In conventional manner, a valve of the invention comprises:

a valve body pierced by an orifice having an axis, said body including a thrust ring surrounding said orifice;

a "dynamic" sealing ring bearing against said thrust ring via a resiliently bendable element, with an outside wall of said sealing ring being constituted by a contact metal;

a closure member to close said orifice; and a mechanism for displacing said closure member between an open position allowing a fluid to pass through said orifice and a closed position in which a bearing surface of said closure member bears against a contact zone of said dynamic sealing ring causing said contact zone to be displaced, said displacements being accompanied by deformation of said sealing ring, and being selected to generate thrust forces that are sufficient to enable sealing to be established between said bearing surface and said contact zone, an amplitude of reversible displacement of said contact zone being related to the elastic deformation capabilities of said contact metal and being limited by the fact that said metal must be selected so that its contact with said bearing surface effectively achieves said sealing. In order to obtain the desired improved sealing, said elastically bendable element intermediate between the dynamic sealing ring and the thrust ring is a support piece in the form of a ring surrounding said orifice and having two edges bearing against said thrust ring, said dynamic sealing ring bearing against said support piece along a line intermediate between said two edges whereby the bending of an axial plane section line of said support piece increases said reversible displacement amplitude of the contact zone of the dynamic sealing ring.

In addition to the above essential features, other improvements in accordance with the invention enabling effectiveness to be further improved are defined below:

the thrust ring is provided with a sloping bearing surface for supporting the dynamic sealing ring against the forces to which it is subjected;

said external wall of the dynamic sealing ring is formed by curving a "dynamic" edge of an annular sealing membrane whose "static" other edge is connected in sealed manner to the body of the valve;

said sealing membrane includes a "dynamic" annular strip whose axial plane section extends obliquely from a curved line to said dynamic sealing ring while remaining at a distance from said valve body, said curved line being intermediate between said dynamic and static edges, said membrane further including a "static" annular strip whose axial plane section extends radially from said curved line to the "static" edge of said membrane, said static strip being held pressed against the surfaces of said valve body;

said static edge of said membrane is curved to form the outer wall of a "static" sealing ring, said static strip and said sealing ring being interposed between said thrust ring and an internal shoulder of said valve body, clamping means urging said thrust ring against said shoulder, thereby deforming the sealing ring and surrounding said strip;

the axial plane section of said support piece is convex towards said dynamic sealing ring in such a manner as to avoid contact between said support member and said sealing membrane;

said dynamic sealing ring includes internal support elements for the sealing ring which are elastically deformable and which bear against the inside surface of its outer wall so that said displacement of the contact zone of said sealing ring is accompanied by limited deformation of said sealing ring while nevertheless generating said thrust forces of sufficient magnitude even after said valve has been opened and closed many times;

said bearing surface of the closure member is made of metal and bears with friction against said contact zone of the sealing ring, said contact metal being additionally selected to avoid any risk of said wall seizing against said bearing surface; and the elastically flexible support piece is made of a metal that is harder than the metal of the contact zone of the dynamic seal.

BRIEF DESCRIPTION OF THE DRAWINGS

An embodiment of the invention is described by way of example with reference to the accompanying drawings, in which.

DETAILED DESCRIPTION

Figure 1:
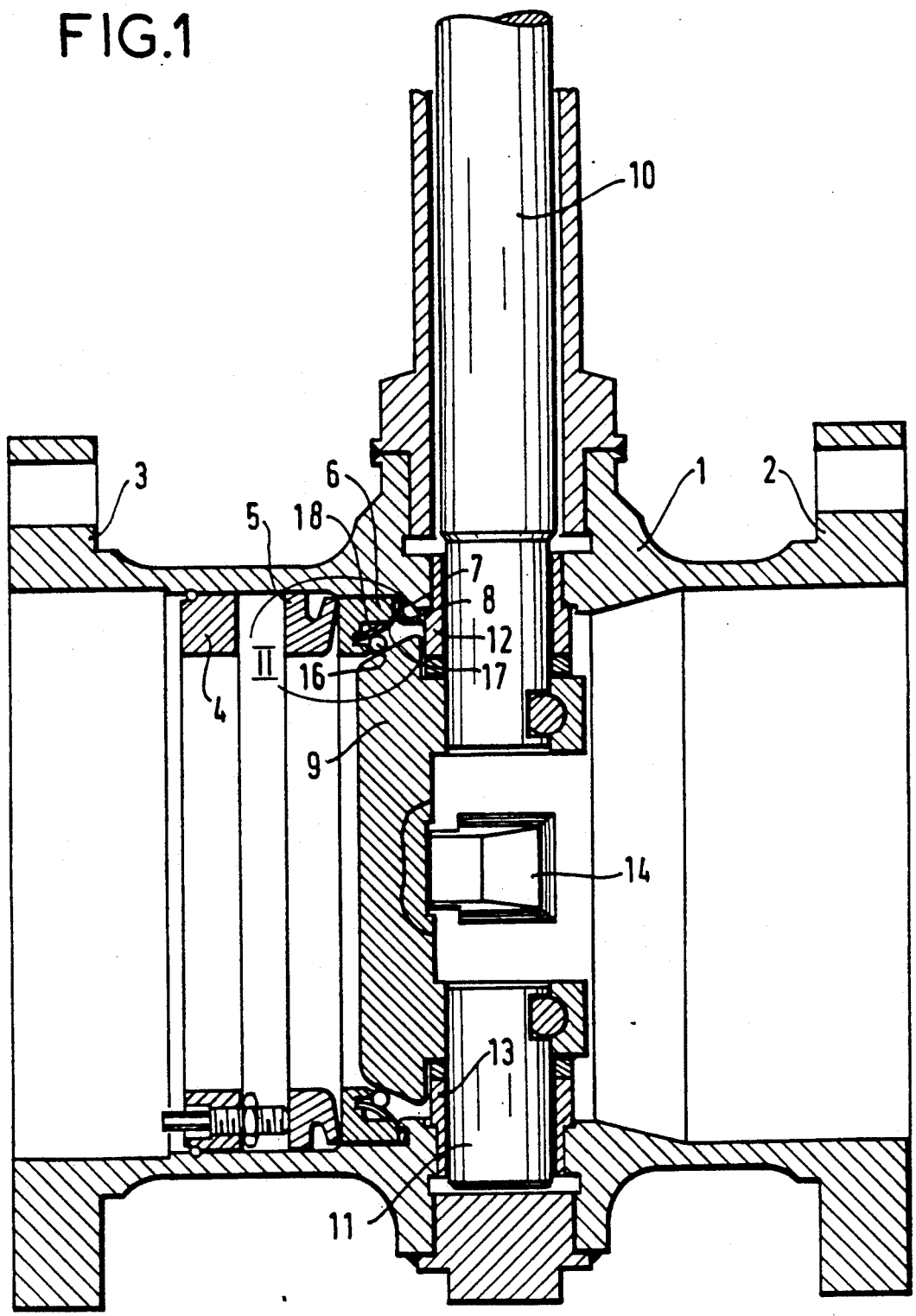
FIG. 1 is an overall view of the valve in section on a diametral plane, with the valve being in its closed position.
Figure 2:
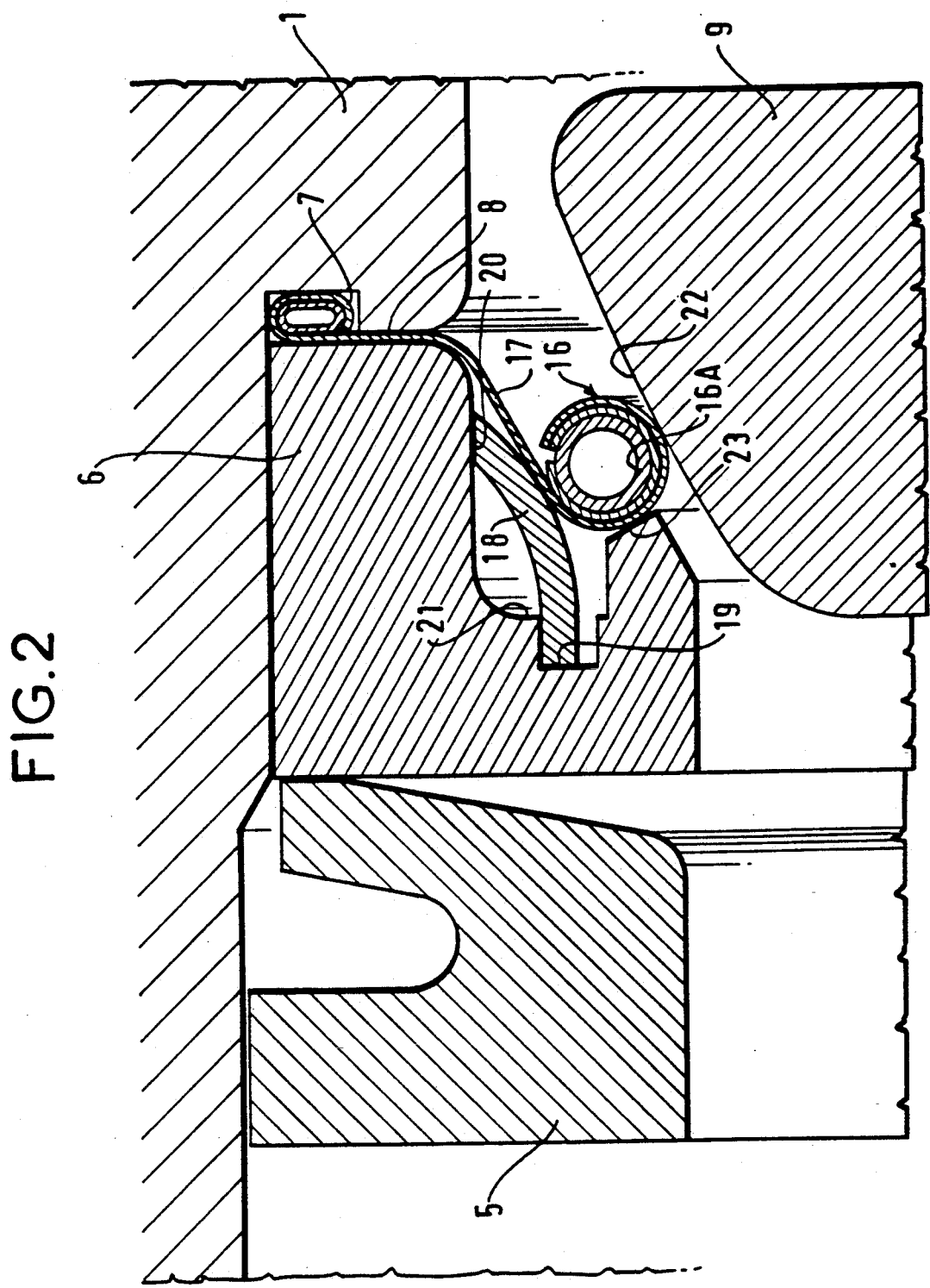
FIG. 2 shows a detail II of FIG. 2 on a larger scale.

In the figures, the valve body 1 extends between fixing flanges 2 and 3. The fluid may flow in either direction. The downstream portion of the valve includes a clamping ring 4 and a transfer ring 5. The thrust ring 6 clamps the static sealing ring 7 with the compression thereof being limited by a shoulder 8 in the valve body.

The shutter member 9 of the valve is moved under the control of a control shaft 10 which rotates in a bearing 12, with rotation being guided by rings 12 and 13 and being limited by abutment of the closure member 14.

The dynamic sealing ring 16 is a portion of a shaped metal blade 17 whose other end is formed by the static sealing ring 7. It is clamped by the edge of the shutter member over a contact zone that varies as a function of the degree to which the valve is closed, and on its side opposite to said contact zone it bears against a support-forming cup-shaped member 18 whose convex face is directed towards the sealing ring, and whose edges 19 and 20 themselves bear against two plane faces that are respectively perpendicular and parallel to the axis of the valve, said faces being formed in a circumferential groove 21 of the thrust ring 6. This cup-shaped member is preferably made of a metal that is harder than the metal of the blade 17.

The dynamic sealing ring 16 preferably includes an elastically deformable internal supporting element 16A that is toroidal in shape, making it possible for the displacement of the contact zone of the sealing ring against the closure member to be accompanied by limited deformation only of said sealing ring while nevertheless generating sufficient contact force.

In the closed position, the dynamic sealing ring 16 is in contact with the sloping bearing surface 23 of the thrust ring 6 which co-operates with the support piece 18 to support the forces to which the sealing ring is subjected and to hold it when it is subjected to high pressures.

The clamping force on the dynamic sealing ring 16 is obtained by it being deformed when it is put into contact with the shutter member in its closed position. The elastic restitution of the sealing function is provided firstly by the restitution specific to said seating ring, and secondly by the cup-shaped member 18 against which it bears. This member also serves to center the dynamic sealing ring automatically relative to the shutter member, and consequently to cause the specific contact pressures between the sealing ring and the shutter member to be made uniform.

In addition, the axis of rotation of the control shaft 10 is offset by a few millimeters from the axis of symmetry of the housing in the valve body, thereby limiting friction between the dynamic sealing ring and the shutter member at the end of the closure stroke or at the beginning of the opening stroke of the valve.

We claim:

1. A valve having a metal seal and comprising:
    a valve body pierced by an orifice having an axis, said body including a thrust ring surrounding said orifice;
    a dynamic sealing ring bearing against said thrust ring via a resiliently bendable element, with an outside wall of said sealing ring being constituted by a contact metal;
    a closure member to close said orifice; and
    a mechanism for displacing said closure member between an open position allowing a fluid to pass through said orifice and a closed position in which a bearing surface of said closure member bears against a contact zone of said dynamic sealing ring causing said contact zone to be displaced, said displacements being accompanied by deformation of said sealing ring, and being selected to generate thrust forces that are sufficient to enable sealing to be established between said bearing surface and said contact zone, an amplitude of reversible displacement of said contact zone being related to the elastic deformation capabilities of said contact metal and being limited by the fact that said metal must be selected so that its contact with said bearing surface effectively achieves said sealing;
    wherein said elastically bendable element intermediate between the dynamic sealing ring and the thrust ring is a support piece in the form of a ring surrounding said orifice and having two edges bearing against said thrust ring, said dynamic sealing ring bearing against said support piece along a line intermediate between said two edges whereby the bending of an axial plane section line of said support piece increases said reversible displacement amplitude of the contact zone of the dynamic sealing ring.

2. A valve according to claim 1, in which the thrust ring is provided with a sloping bearing surface for supporting the dynamic sealing ring against the forces to which it is subjected.

3. A valve according to claim 1, in which said external wall of the dynamic sealing ring is formed by curving a dynamic edge of an annular sealing membrane whose static other edge is connected in sealed manner to the body of the valve.

4. A valve according to claim 3, wherein said sealing membrane includes a dynamic annular strip whose axial plane section extends obliquely from a curved line to said dynamic sealing ring while remaining at a distance from said valve body, said curved line being intermediate between said dynamic and static edges, said membrane further including a static annular strip whose axial plane section extends radially from said curved line to the static edge of said membrane, said static strip being held pressed against the surfaces of said value body.

5. A valve according to claim 4, in which said static edge of said membrane is curved to form the outer wall of a static sealing ring, said static strip and said sealing ring being interposed between said thrust ring and an internal shoulder of said valve body, clamping means urging said thrust ring against said shoulder, thereby deforming the sealing ring and surrounding said strip.

6. A valve according to claim 3, wherein the axial plane section of said support piece is convex towards said dynamic sealing ring in such a manner as to avoid contact between said support member and said sealing membrane.

7. A valve according to claim 1, in which said dynamic sealing ring includes internal support elements for the sealing ring which are elastically deformable and which bear against the inside surface of its outer wall so that said displacement of the contact zone of said sealing ring is accompanied by limited deformation of said sealing ring while nevertheless generating said thrust forces of sufficient magnitude even after said valve has been opened and closed many times.

8. A valve according to claim 1, in which said bearing surface of the closure member is made of metal and bears with friction against said contact zone of the sealing ring, said contact metal being additionally selected to avoid any risk of said wall seizing against said bearing surface.

9. A valve according to claim 1, wherein said support piece is made of a metal that is harder than said contact metal.

* * * * *